(12) United States Patent
Kobayashi et al.

(10) Patent No.: US 8,682,167 B2
(45) Date of Patent: Mar. 25, 2014

(54) OPTICAL TRANSMISSION DEVICE

(75) Inventors: Hideki Kobayashi, Kawasaki (JP);
Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 947 days.

(21) Appl. No.: 12/338,184

(22) Filed: Dec. 18, 2008

(65) Prior Publication Data
US 2009/0162067 A1    Jun. 25, 2009

(30) Foreign Application Priority Data

Dec. 20, 2007   (JP) .................................. 2007-329370

(51) Int. Cl.
*H04J 14/02* (2006.01)

(52) U.S. Cl.
USPC .................................. 398/94; 398/83; 398/93

(58) Field of Classification Search
USPC ............ 359/341.41, 341.42; 398/79, 83, 993,
398/94, 97, 173, 180
See application file for complete search history.

(56) References Cited

U.S. PATENT DOCUMENTS

| | | | |
|---|---|---|---|
| 6,025,947 A * | 2/2000 | Sugaya et al. ................... | 398/97 |
| 6,055,092 A | 4/2000 | Sugaya et al. | |
| 6,201,635 B1 | 3/2001 | Yamanaka et al. | |
| 6,594,046 B1 * | 7/2003 | Nishino ......................... | 359/239 |
| 2001/0017729 A1 | 8/2001 | Sugaya et al. | |
| 2003/0002104 A1 * | 1/2003 | Caroli et al. ................... | 359/127 |
| 2003/0099032 A1 * | 5/2003 | Asao et al. ................. | 359/341.4 |
| 2003/0106990 A1 * | 6/2003 | Tomofuji et al. ....... | 250/214 LA |
| 2004/0037564 A1 * | 2/2004 | Halevi et al. ..................... | 398/94 |
| 2005/0158057 A1 * | 7/2005 | Tomofuji et al. ............. | 398/160 |
| 2007/0014513 A1 | 1/2007 | Isomura et al. | |
| 2007/0269215 A1 | 11/2007 | Sugaya | |
| 2008/0013954 A1 * | 1/2008 | Boduch et al. .................. | 398/83 |
| 2009/0074418 A1 * | 3/2009 | Levy et al. ....................... | 398/83 |

FOREIGN PATENT DOCUMENTS

| | | |
|---|---|---|
| JP | 08-248455 | 9/1996 |
| JP | 10-051057 | 2/1998 |
| JP | 10-51057 | 2/1998 |
| JP | 2000-22639 | 1/2000 |
| JP | 2003-174421 | 6/2003 |

(Continued)

OTHER PUBLICATIONS

Japanese Office Action for Application No. 2007-329370 issued Jun. 12, 2012.

(Continued)

*Primary Examiner* — Daniel Dobson
(74) *Attorney, Agent, or Firm* — Staas & Halsey LLP

(57) ABSTRACT

An optical apparatus includes a first optical amplifier for adjusting an output value to a constant level; an optical signal processor located before the first optical amplifier and processing the optical signal; a second optical amplifier located before the optical signal processor and subjected to automatic gain control for adjusting a gain constant; and a controller detecting a level of the optical signal at an output of the second optical amplifier. The controller adjusts a level of an output value of the first optical amplifier such that the level of the optical signal at the output of the second optical amplifier is held at the optimum value if the detected level of the optical signal differs from an optimum value, compensates for a loss caused in the optical signal processor and maintains the level of the optical signal at the output of the second optical amplifier at the optimum value.

6 Claims, 14 Drawing Sheets

(56) References Cited

FOREIGN PATENT DOCUMENTS

| | | |
|---|---|---|
| JP | 2007-28207 | 2/2007 |
| JP | 2007-213155 | 11/2007 |
| JP | 2007-312155 | 11/2007 |

OTHER PUBLICATIONS

Japanese Office Action issued Jan. 17, 2012 in corresponding Japanese Patent Application No. 2007-329370.

* cited by examiner

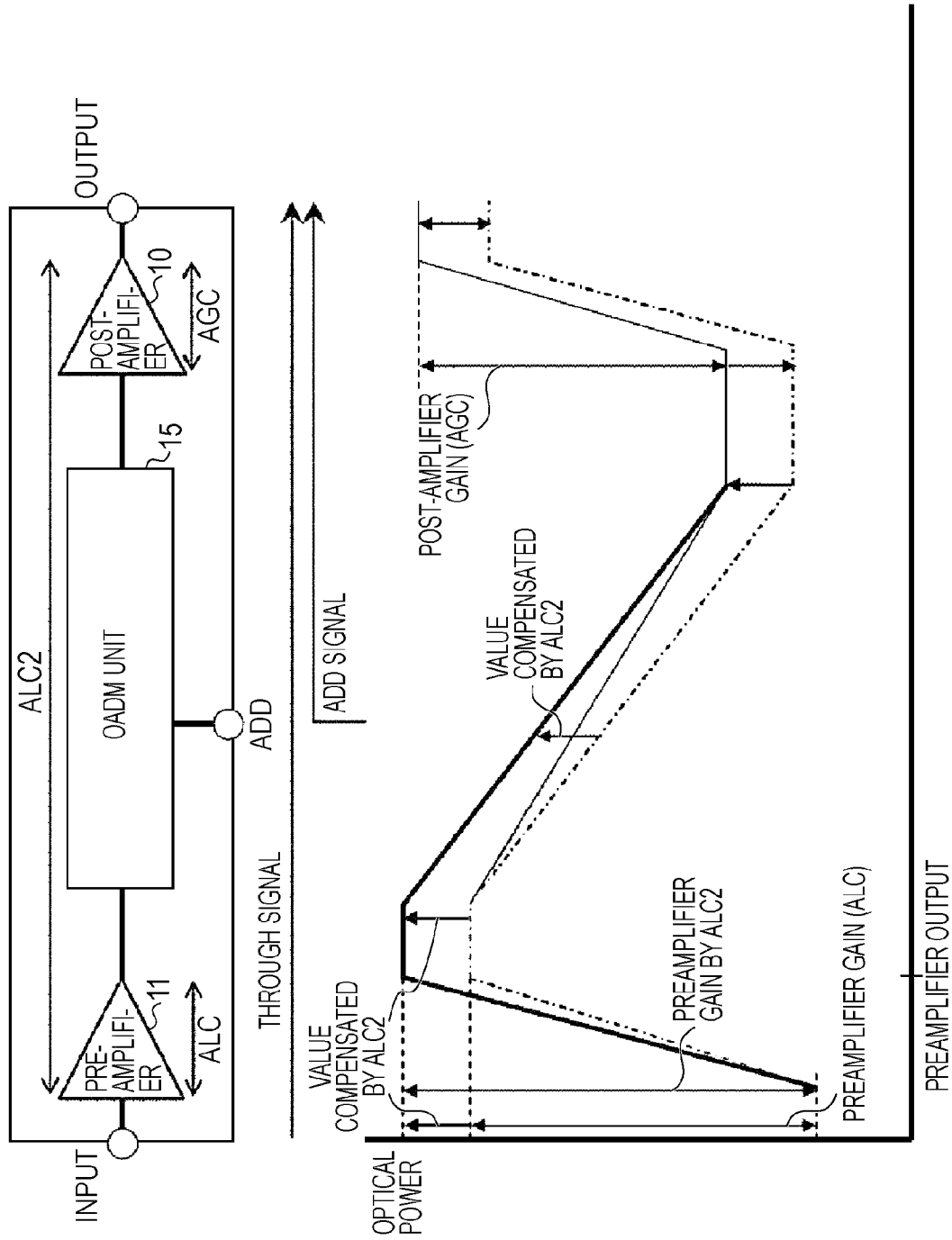

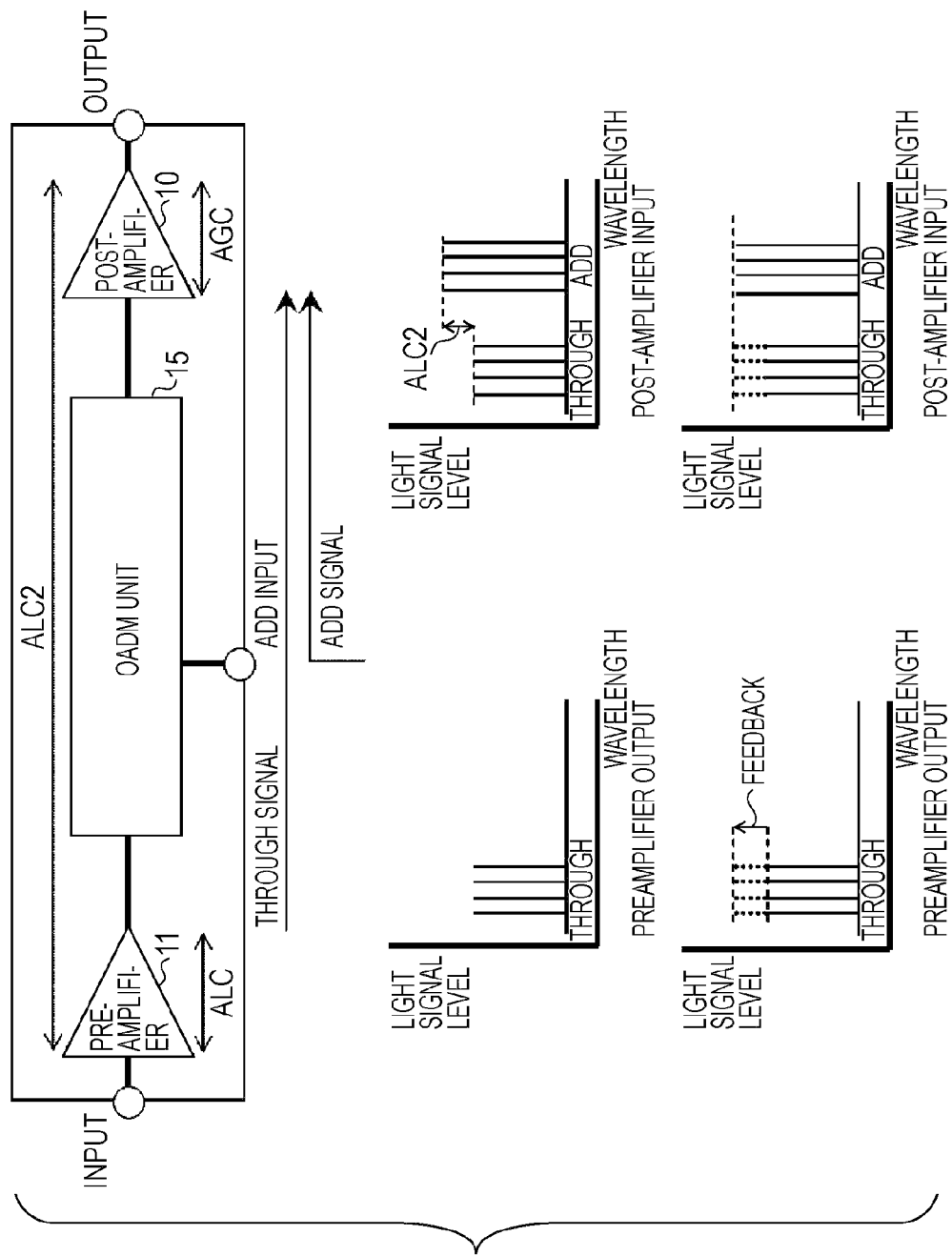

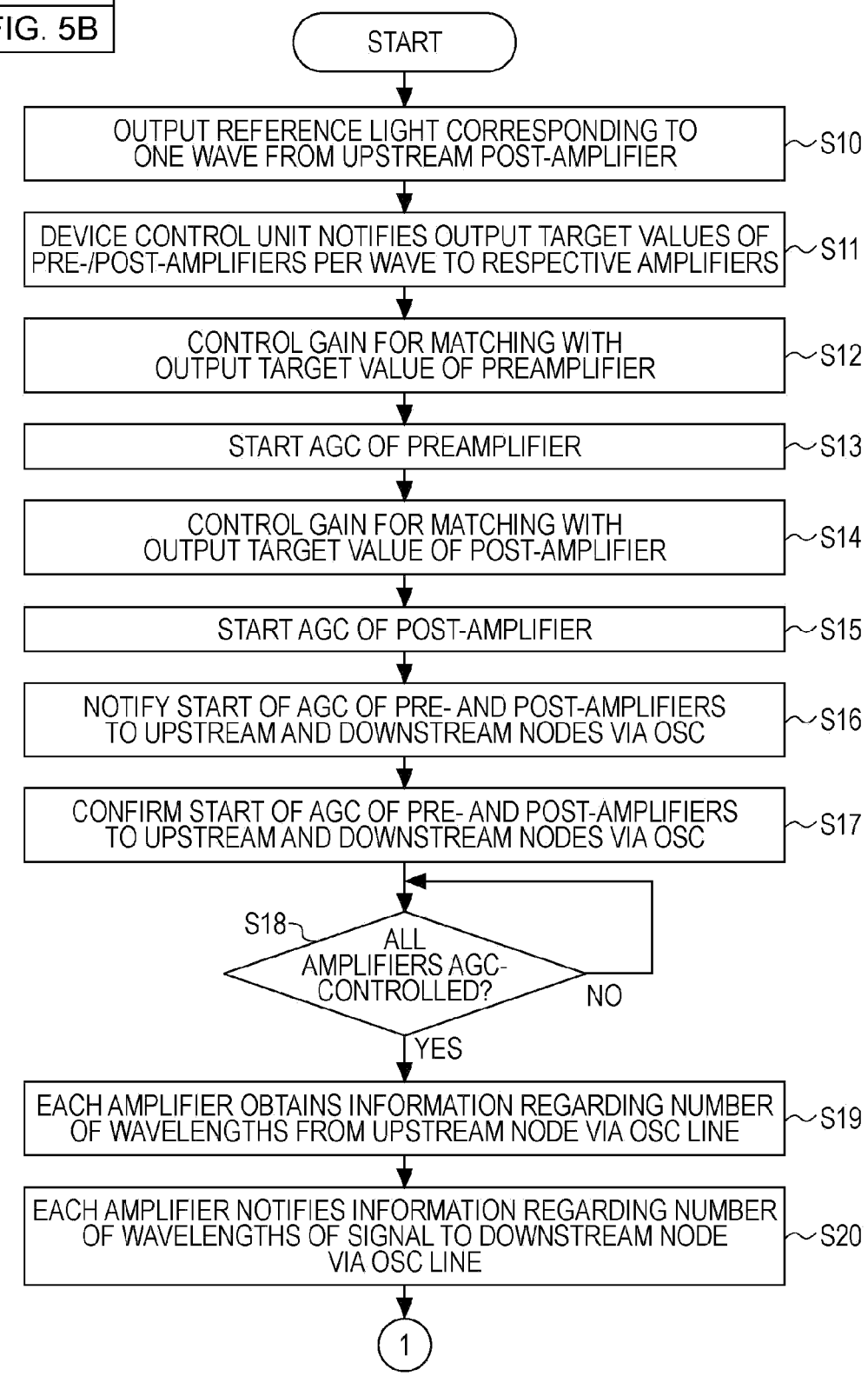

__OPTICAL TRANSMISSION DEVICE__

CROSS-REFERENCE TO RELATED APPLICATIONS

This application is based upon and claims the benefit of priority of the prior Japanese Patent Application No. 2007-329370, filed on Dec. 20, 2007, the entire contents of which are incorporated herein by reference.

BACKGROUND

1. Field

The present invention relates to an optical transmission device for use in a wavelength division multiplexed (WDM) optical transmission system.

2. Description of the Related Art

For optical transmission devices used in a WDM optical transmission system for transmitting a WDM optical signal, there are an Optical Add-Drop Multiplexer (OADM) for adding and dropping the optical signal to and from a transmission line, and an In-Line Amplifier (ILA) for amplifying and relaying the optical signal.

FIG. 10 illustrates a conventional OADM. In FIG. 10, a conventional OADM 0 includes a post-amplifier 10 that transmits an optical signal to an optical transmission line 1, a pre-amplifier 11 that receives the optical signal from the optical transmission line 1, an OADM unit 12 that realizes an OADM function, OSC units 13 that transmit and receive device control signals (such as signals for notifying the device control status or number of wavelengths), and a device controller 14 that controls various units in the device (OADM).

The OADM unit 12 includes a PD1 that monitors an input power, an optical coupler (CPL) 16 that drops the optical signal, a Wavelength Selective Switch (WSS) 17 that realizes the OADM function, an Optical Channel Monitor (OCM) 18 that monitors each channel, a PD2 that monitors an output power, a multiplexing unit (MUX) 19 that combines optical signals of different wavelengths into a WDM optical signal, and a demultiplexing unit (DEMUX) 20 that demultiplexes the WDM signal into optical signals of different wavelengths.

FIG. 6A illustrates the configuration of the WSS 17 shown in FIG. 10. In the WSS 17, a demultiplexing unit (DEMUX) 61 demultiplexes the light supplied to an input port, and a demultiplexing unit (DEMUX) 62 demultiplexes the light supplied to an Add port. Switches (SW) 63-1 to 63-$n$ perform switching. Additionally, variable optical attenuators (VOAs) 64-1 to 64-$n$, which are located after the switches 63-1 to 63-$n$, respectively, adjust respective levels of the lights output from the switches 63-1 to 63-$n$, and multiplexing unit (MUX) 65 multiplexes the lights for outputting.

FIG. 11 illustrates the configuration of a conventional ILA. The same components in FIG. 11 as those in FIG. 10 are denoted by the same reference numerals, and a description of those components is omitted here.

A conventional ILA 2 is a transmission device that neither adds nor drops the optical signal. Thus, the ILA 2 has the configuration that the OADM unit 12 of the OADM 0, shown in FIG. 10, is replaced with an optical attenuator 21.

An optical amplifier used in an optical transmission system serves to amplify an optical signal which has been subjected to loss through a transmission line and components of an optical transmission device, and to compensate for the loss to keep a level of the optical signal at a desired value. A level of the output optical signal in the optical transmission system needs to be held constant to stabilize the operation of the system. As examples of a method of controlling the output signal level, there are ALC (Automatic Level Control) for holding an output level of an optical amplifier constant, and AGC (Automatic Gain Control) for holding a gain of an optical amplifier, i.e., a ratio of an output light level to an input light level, constant.

In the ALC of the optical amplifier, an output light level, i.e., a level corresponding to the total sum of levels of multiplexed optical signals, is controlled. Feedback control in the ALC is performed by applying feedback to an output so that a level per wavelength, which is obtained from the output light level and the number of wavelengths, becomes a target level.

The ALC is advantageous in having high accuracy in control of the output signal level because an output light signal level is always monitored and the feedback control is executed after converting the monitored level to a level per wavelength. However, the ALC is inferior in timeliness of control because of the necessity of executing a computation process and a feedback process of the light level. Accordingly, if the input light level undergoes a transient variation, time is required until the output light level matches with the desired light level. Additionally, a control circuit used in the ALC is more complicated than that used in the AGC, thus increasing the cost of the optical amplifier.

On the other hand, the AGC is a control for holding a ratio of the output light level to the input light level (i.e., a gain) of the optical amplifier constant. Thus, the AGC is performed so as to keep the gain constant with respect to the input signal level.

Because there is no necessity for executing computation in the control circuit, the AGC is superior in timeliness of control and causes a less influence upon the output if the input light level undergoes a transient variation. In addition, because the control circuit for the AGC is smaller, the cost of the AGC is lower than that of the ALC.

Additionally, in the AGC where the optical amplifier is controlled so as to keep the gain constant, if temperatures and properties of various components located before the optical amplifier are varied with the lapse of time and losses are changed, the control is not executed in a manner adapted for the change. Therefore, accuracy in the control of the optical signal level per wavelength deteriorates and an error occurs in the output level of the optical amplifier.

Such an error of the output light level from the desired value causes variations in the input level of the optical signal applied to the transmission line and the other components. For example, if the output level of the optical amplifier is increased, a nonlinear effect is generated in an optical fiber of the transmission line and the other components. In addition, if the output level of the optical amplifier is reduced, a signal level in another OADM falls below the required level, or an SN ratio is reduced, thus causing deterioration of the transmission performance.

The following factors are taken into consideration if the ALC or the AGC is selected as a control method for the optical amplifier used in the OADM and the ILA.

An AGC is selected as a control method for the post-amplifier in many cases because the AGC provides good transient response characteristics with respect to a variation in the number of wavelengths and is economically superior to the ALC.

However, if the AGC is selected for the post-amplifier, a variation in loss at the OADM unit, which is located before the post-amplifier, raises a problem. More specifically, since the OADM unit is made up of various optical parts to realize the add/drop/multiplex functions, loss at the OADM unit varies due to variations in losses of the parts depending on temperature and the lapse of time. Those variations change the input level of the pre-amplifier and hence deteriorate the transmission performance, as described above.

Additionally, in order to suppress the level change of the pre-amplifier, individual adjustments in the control are required by using the variable optical attenuators (VOAs) 64-1 to 64-$n$ for individual wavelengths in the WSS 17, as shown in FIG. 6A, so that the optical signal levels of respective wavelengths are matched with one another. The VOA is inserted per channel even in an OADM node that does not require the light level control for respective wavelengths (i.e., a node in which a signal wavelength is not added and is only dropped), thus resulting in an increase of the cost.

An optical fiber for the transmission line is located before the pre-amplifier. In some cases, the optical fiber for the transmission line generates changes (such as a diurnal change and an annual change) of environment temperature with the lapse of time due to geographical conditions (environmental conditions) under which the optical fiber is laid, and the form of the laying (such as underground, undersea, or exposure to the atmosphere). Those temperature changes with a lapse of time increase and reduce the loss occurring in the optical fiber for the transmission line. In the pre-amplifier, therefore, the input light signal level is varied by a larger amount than in the post-amplifier. From the viewpoint of absorbing and compensating for such a large variation of the input signal level, it is effective to select the ALC for the pre-amplifier because of the necessity of controlling the light output level to the desired value.

FIG. 12 is a block diagram of the post-amplifier.

The post-amplifier includes an input monitor PD (photodiode) 25 that detects an input light signal level of the post-amplifier, an Er-doped fiber (EDF) 26 that amplifies an optical signal, an output monitor PD (photodiode) 27 that detects an output signal level of the post-amplifier, optical couplers 28 that branch input and output signals of the post-amplifier to the respective monitor PDs and inject an excitation light into the EDR 26, an amplifier controller 29 that detects the input and output signal levels of the post-amplifier from the input and output monitor PDs 25 and 27, calculates the difference between the detected input and output signal levels, and executes control of the excitation light and the input light applied to the EDF 26 so that the gain is controlled to match a desired gain preset in an initial state, and excitation LDs 30 that each output the excitation light for exciting the EDF 26. Additionally, the amplifier controller 29 concurrently transfers the operation state of the amplifier (including an alarm, performance, control status, control information, etc.) and information regarding the number of wavelengths to the device controller (denoted by 14 in FIGS. 10 and 11).

FIG. 13 is a block diagram of the pre-amplifier.

In FIG. 13, the same components as those in FIG. 12 are denoted by the same reference numerals.

As in the above-described post-amplifier, the pre-amplifier includes an input monitor PD (photodiode) 25 that detects an input light signal level of the pre-amplifier, an Er-doped fiber (EDF) 26 that amplifies an optical signal, an output monitor PD (photodiode) 27 that detects an output signal level of the pre-amplifier, optical couplers 28 that branch input and output signals of the pre-amplifier to the respective monitor PDs and inject an excitation light into the EDR 26, an amplifier controller 29 that detects the input and output signal levels of the pre-amplifier from the input and output monitor PDs 25 and 27, calculates the difference between the detected input and output signal levels, and executes control of the excitation light and the input light applied to the EDF 26 so that the gain is controlled to match a desired gain preset in an initial state, and excitation LDs 30 that each output the excitation light for exciting the EDF 26. Additionally, the amplifier controller 29 concurrently transfers the operation state of the amplifier (including an alarm, performance, control status, control information, etc.) and information regarding the number of wavelengths to the device controller (denoted by 14 in FIGS. 10 and 11).

Regarding an optical transmission system including optical amplifiers in previous and subsequent stages, for example, Japanese Unexamined Patent Application Publication No. 2000-22639 discloses a technique of detecting a signal loss by a dispersion compensator disposed between the optical amplifiers and compensating for the detected loss. In addition, Japanese Unexamined Patent Application Publication No. 8-248455 discloses a two-stage optical amplifier in which light power dependency upon wavelength is removed.

A significant factor causing deterioration of the characteristics in the OADM resides in that the output of each amplifier is varied and the input level applied to the transmission line is changed from the design value. While the ALC is effective in controlling the output variation as described above, it is effective to employ the AGC in the post-amplifier in consideration of, e.g., a variation in a transient response. For that reason, generally, the post-amplifier is controlled on the basis of AGC (AGC-controlled) and the pre-amplifier is controlled on the basis of ALC (ALC-controlled).

A level adjustment is required in the case of AGC-controlling the post-amplifier and ALC-controlling the pre-amplifier for matching the respective signal levels with one another after demultiplexing into individual channels in the WSS of the OADM unit, in order to remove the loss variation of the OADM unit with the lapse of time.

If the level adjustment is executed after the demultiplexing into individual channels in the WSS of the OADM unit, the VOA function is required after each of all the switches in the WSS, as shown in FIG. 6A. This raises the problem of cost efficiency in, particularly, the OADM that does not require the Add function.

Additionally, in the ILA, an input to the post-amplifier may deviate from the desired value and a fiber input level may be varied depending on the temperature, the lapse of time, and an individual variation of the optical attenuator disposed between the pre-amplifier and the post-amplifier. Such a variation of the fiber input level causes significant deterioration of the transmission performance.

SUMMARY

An optical apparatus includes a first optical amplifier subjected to automatic level control for adjusting an output value to a constant level; an optical signal processor located before the first optical amplifier and configured to process the optical signal; a second optical amplifier located before the optical signal processor and subjected to automatic gain control for adjusting a gain constant; and a controller configured to detect a level of the optical signal at an output of the second optical amplifier, wherein the controller is configured to adjust a level of an output value of the first optical amplifier such that the level of the optical signal at the output of the second optical amplifier is held at the optimum value if the detected level of the optical signal differs from an optimum value, and thereby compensating for a loss caused in the optical signal processor and maintaining the level of the optical signal at the output of the second optical amplifier at the optimum value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 3 illustrates level changes of light signals in the OADM according to the embodiment;

FIG. 4 illustrates level changes of the optical signals in the OADM according to the embodiment;

FIGS. 5A and 5B are flowcharts illustrating a process flow according to the embodiment;

DETAILED DESCRIPTION OF THE PREFERRED EMBODIMENTS

Figure 1:
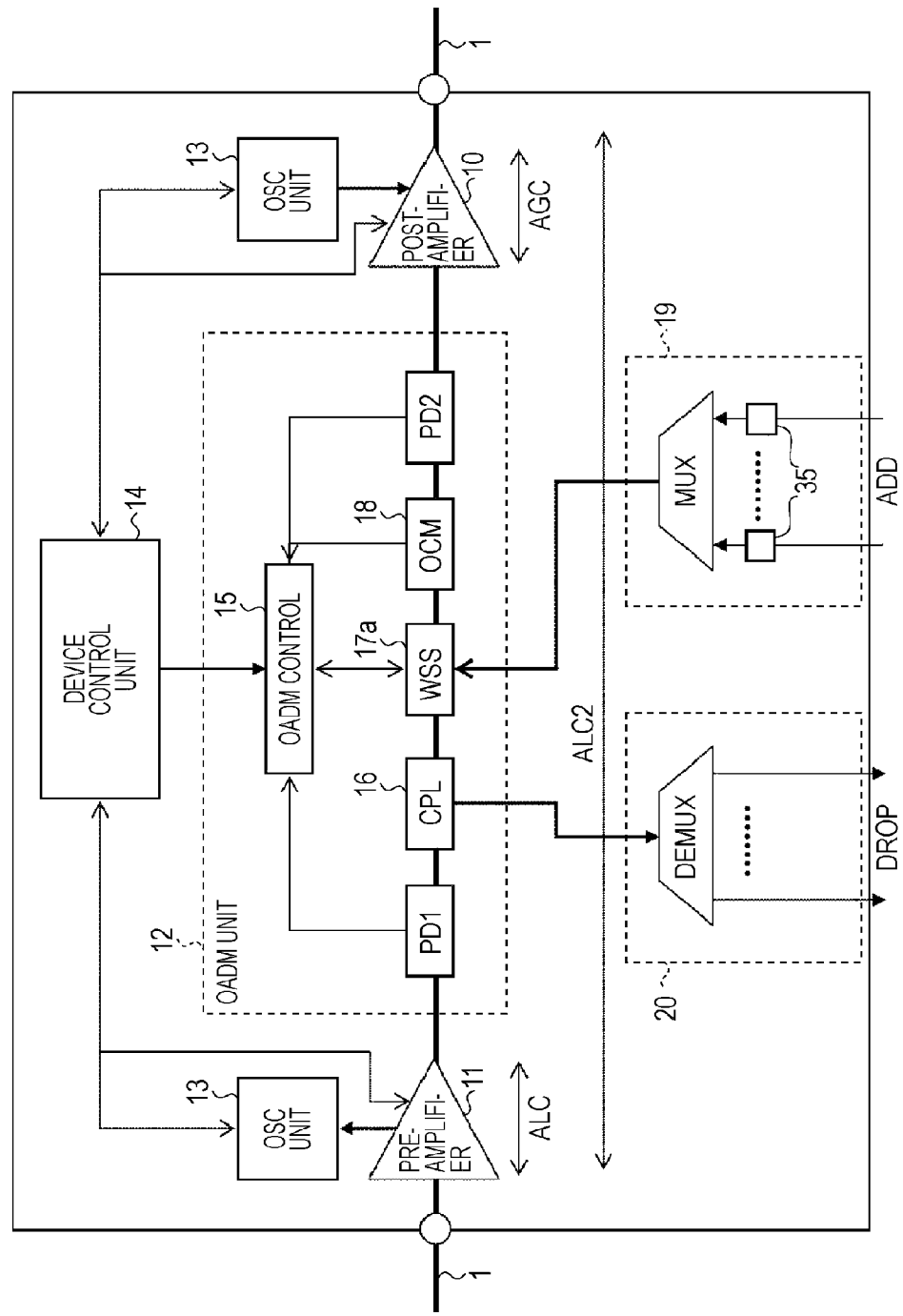
FIG. 1 is a block diagram of an OADM according to an embodiment.

Reference may now be made in detail to embodiments of the present invention, examples of which are illustrated in the accompanying drawings, wherein like reference numerals refer to like elements throughout.

FIG. 1 is a block diagram of an OADM according to one embodiment of the present invention.

Figure 10:
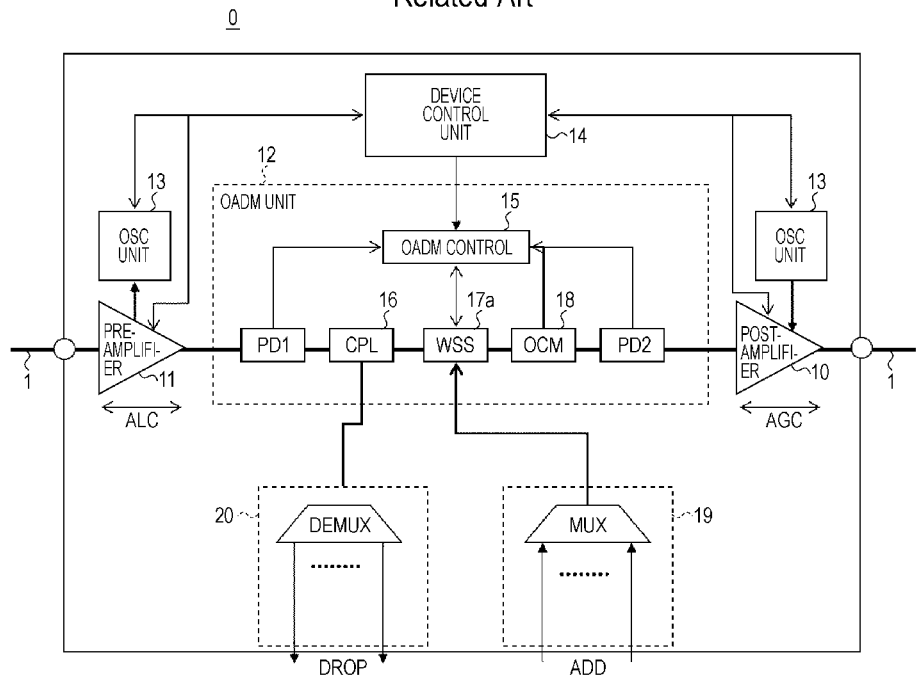
FIG. 10 is a block diagram of an OADM according to the related art.

The same components in FIG. 1 as those in FIG. 10 are denoted by the same reference numerals, and a description of those components is omitted here.

Figure 6A:
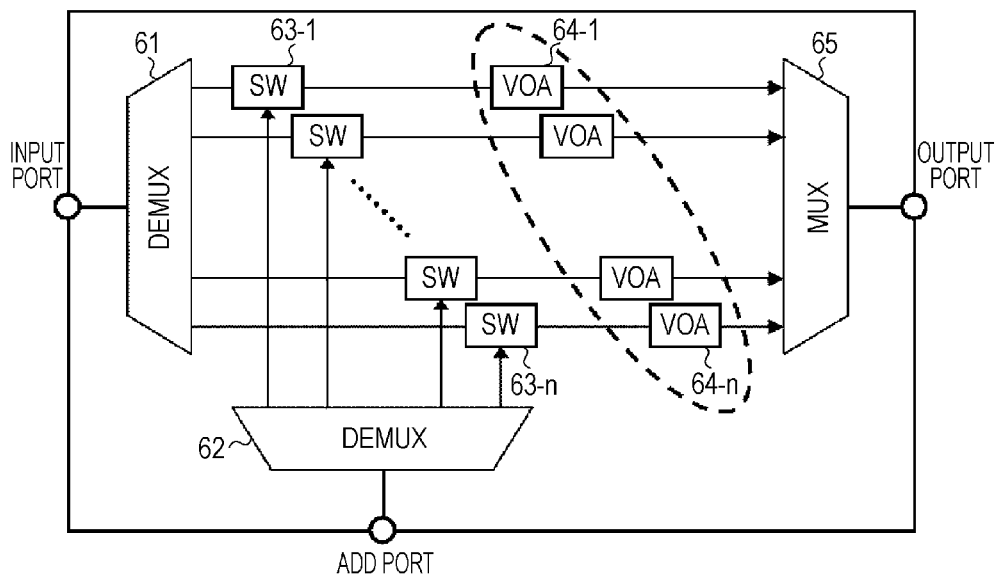
FIG. 6A is a block diagram of a WSS according to the related art.
Figure 6B:
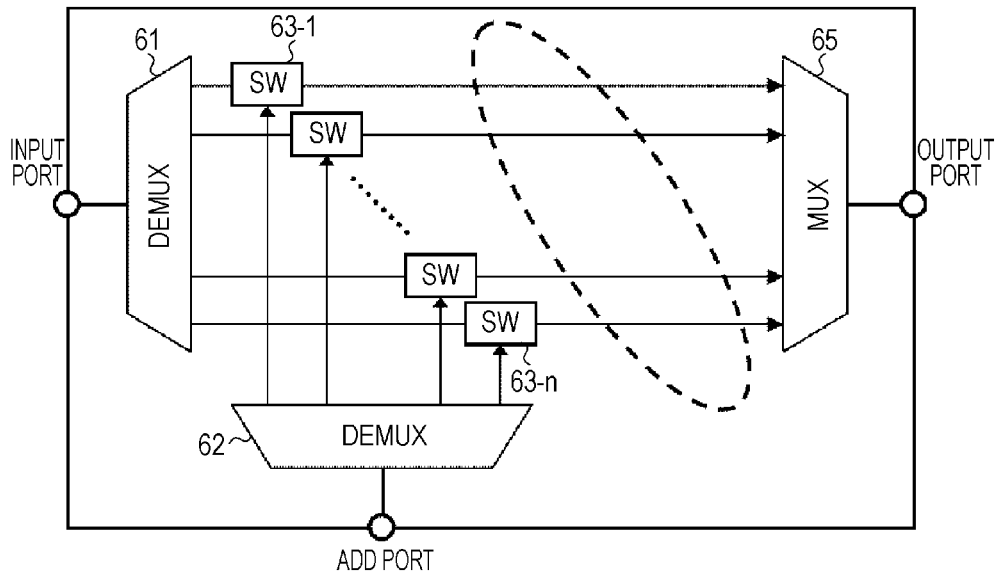
FIG. 6B is a block diagram of a WSS according to the embodiment.

Unlike the conventional OADM shown in FIG. 10, which has a Wavelength Selective Switch (WSS) 17a, shown in FIG. 6B, an OADM 0 shown in FIG. 1 has a Wavelength Selective Switch (WSS) 17, shown in FIG. 6A, and an optical attenuator 35 at a signal Add input of a multiplexing unit (MUX) 19 for each wavelength. The WSS 17a includes variable optical attenuators (VOAs) and the WSS 17 do not include any VOAs.

In the OADM shown in FIG. 1, a pre-amplifier 11 is ALC-controlled as a unit and a post-amplifier 10 is AGC-controlled as a unit. In addition to such control as a unit, an output light signal level of the post-amplifier 10 is detected and fed back to an output signal level of the pre-amplifier 11 so that the difference between the detected level and an appropriate value is compensated for. As a result, the OADM is ALC-controlled in its entirety (as indicated by ALC2).

Figure 2:
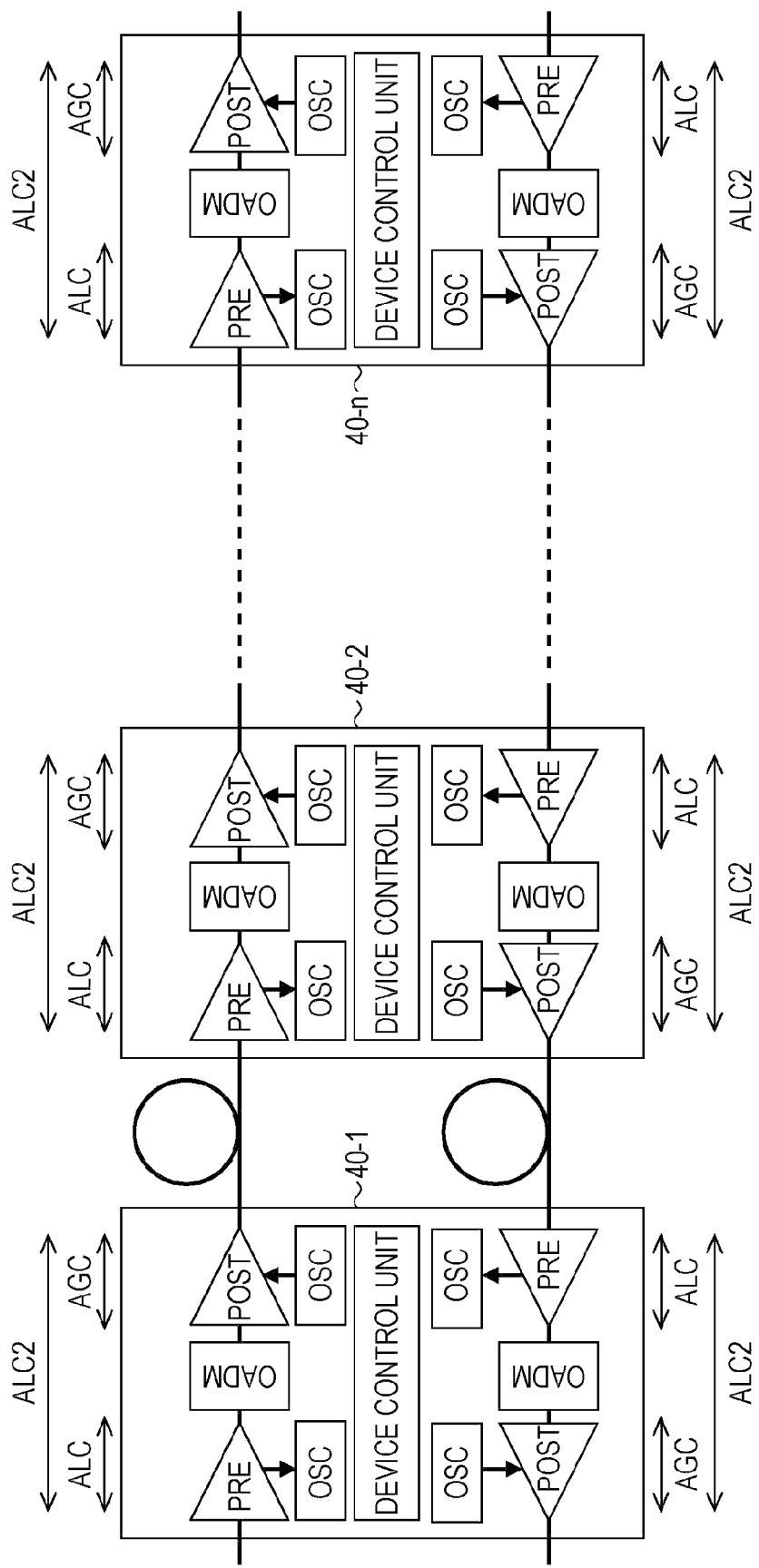
FIG. 2 illustrates an optical communication system made up of the OADMs each according to the embodiment.

FIG. 2 illustrates an optical communication system made up of the OADMs each configured as shown in FIG. 1. In the optical communication system of FIG. 2, OADMs 40-1 to 40-$n$ are interconnected through transmission lines. Each of the OADMs 40-1 to 40-$n$ includes an up-line device and a down-line device each including a pre-amplifier (PRE), a post-amplifier (POST), an OADM unit, and OSC units. The up-line device and the down-line device are both controlled by a device controller. In each of the OADMs, as described above, the pre-amplifier is ACL-controlled and the post-amplifier is AGC-controlled. Additionally, as described above, the output of the post-amplifier is monitored and the feedback control, indicated by ALC2, is executed to adjust the output level of the pre-amplifier so that the output of the post-amplifier is held constant.

FIGS. 3 and 4 are explanatory views for explaining level changes of light signals in each OADM. Specifically, FIG. 3 illustrates the level changes of the optical signals in the OADM from an input to an output thereof.

In the OADM, there are an Add signal that is added midway, and a Through signal that is transmitted through the OADM. Because the Add signal and the Through signal are combined together after passing through different paths within the OADM unit, levels of respective losses of those signals do not match each other. Stated another way, because the WSS of the OADM, shown in FIG. 1, includes no variable optical attenuators (VOAs), variations occur in respective levels of the Add signal and the Through signal output from the post-amplifier.

Referring to FIG. 3, a thin solid line represents the level change of the Add signal, and a dotted line represents the level change of the Through signal. In FIG. 3, the level of the Through signal (indicated by the dotted line) is positioned lower than the level of the Add signal (indicated by the thin solid line) for the reason that the losses of the Add signal and the Through signal the OADM unit differ from each other in.

Accordingly, if the Through signal and the Add signal are combined together and input to the post-amplifier in the OADM unit in the state where there is a level difference between the Through signal and the Add signal, the Through signal and the Add signal are amplified while the level difference remains between both the signals, because the post-amplifier operates in accordance with the AGC.

In view of the above-mentioned point, the level difference between the Through signal and the Add signal is detected at the output of the post-amplifier, and the level of the Through signal is compensated for by increasing the output level of the ALC-controlled pre-amplifier. As a result, the respective levels of the Through signal and the Add signal can match each other.

FIG. 4 is an explanatory view for explaining the above-described operation from the viewpoint of spectra of a WDM light signal.

An intensity level of the Through signal is changed depending on deterioration of the OADM unit with the lapse of time and changes of temperature. If the Through signal having the changed intensity level is combined with the Add signal, the Through signal and the Add signal are combined together after passing through the different paths in the OADM unit, and hence respective levels of losses of those signals do not match each other. For that reason, variations occur in the respective output levels of the Through signal and the Add signal from the post-amplifier.

To compensate for those variations, the level difference between the Through signal and the Add signal is fed back to the pre-amplifier to execute the control indicated by ALC2. As a result, the level of the Through signal is adjusted such that the respective intensity levels of the Through signal and the Add signal can match each other if they are combined together.

Figure 5B:
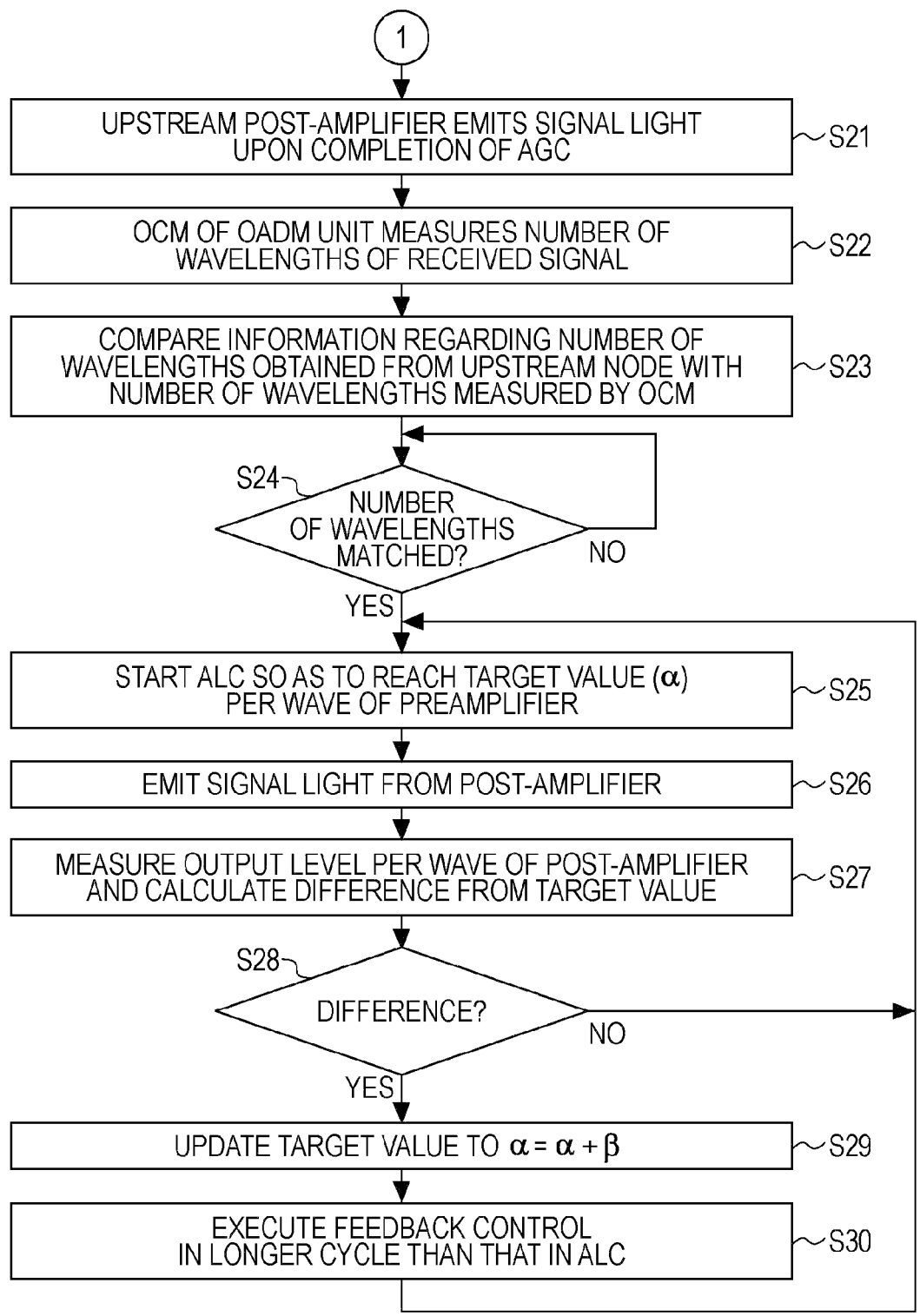

FIGS. 5A and 5B are flowcharts illustrating a process flow according to the one embodiment of the present invention.

Control setting procedures for the amplifiers to execute the above-mentioned control will be described below.

First, in operation S10, a reference light (corresponding to one wave of the post-amplifier output) is output from the post-amplifier, i.e., an upstream node, for adjustment of the amplifier gain. In operation S11, the device controller notifies respective control target values per wavelength to the pre- and post-amplifiers. In operation S12, the pre-amplifier, i.e., a downstream node, receives an input light corresponding to one wave, which is provided by the reference light corresponding to one wave and output from the post-amplifier after it has been subjected to the transmission line loss. The gain of the pre-amplifier is adjusted to a value that is required to compensate for the transmission line loss. As a result, the pre-amplifier outputs a desired light level per wavelength.

In operation S13, the AGC operation of the pre-amplifier is started. In operation S14, the post-amplifier receives an input light corresponding to one wave, which is provided by the reference light corresponding to one wave and output from the pre-amplifier after it has been subjected to the loss generated in the OADM unit within the relevant node. The gain of the post-amplifier is adjusted to a value that is required to compensate for the loss generated within the node. As a result, the post-amplifier outputs a desired light level per wavelength.

In operation S15, the AGC operation of the post-amplifier is started. In operation S16, the end-of-gain-setup status is notified to the downstream node via an OSC line and to the upstream node by using an opposing OSC line. In operation S17, it is confirmed that a post-amplifier upstream of the relevant node and a pre-amplifier downstream of the relevant node are each AGC-controlled. In operation S18, the device controller waits until all the amplifiers are AGC-controlled. In operation S19, information regarding the number of wavelengths is confirmed from the upstream node via the OSC line.

In operation S20, information regarding wavelength(s) to be added/dropped at the relevant node is added to the information regarding the number of wavelengths and notified from the upstream node, and an addition result is notified to the downstream node via the OSC line. In operation S21, the upstream post-amplifier shifts from a reference light emitting state to an optical signal emitting state. In operation S22, an OCM (Optical Channel Monitor) of the OADM measures the actual number of transmission wavelengths.

In operation S23, the result of adding the number of wavelengths to be added/dropped at the relevant node to the information regarding the number of wavelengths and obtained from the upstream node is compared with the number of wavelengths measured in operation S22. In operation S24, it is determined whether the result of comparing the numbers of wavelengths provides a match. If the numbers of wavelengths match each other in operation S24, the pre-amplifier shifts to the ALC operation in operation S25. Herein, a target value per wavelength is set to $\alpha$.

In operation S26, the post-amplifier of the relevant node shifts from a reference light emitting state to an optical signal emitting state. In operation S27, a deviation ($\beta$) from the target value of the post-amplifier is calculated and information regarding the calculated difference is notified to the pre-amplifier. If it is determined in operation S28 that the deviation does not exist, the process returns to operation S25. If it is determined in operation S28 that the deviation exists, the target value a of the output level of the pre-amplifier is updated in operation S29 to $\alpha=\alpha+\beta$ on the basis of the difference information from the post-amplifier, and the output control of the pre-amplifier is shifted to the feedback control ALC2. Thereafter, in operation S30, the feedback control ALC2 is performed so as to compensate for output variations of the post-amplifier in a longer cycle than that in the ALC.

With the OADM shown in FIG. 1, as described above, since the intensity level of the Through signal can be adjusted by the pre-amplifier 11 and the intensity level of the Add signal can be adjusted by the VOAs 35 in the MUX 19 for applying the Add signal, the VOAs are no longer required to be disposed in the WSS 17a and the cost of the OADM can be reduced correspondingly.

Additionally, the Through signal and the Add signal added in the relevant node are subjected to different losses in the paths until they are combined together in the OADM unit of the relevant node, due to different types and individual variations of parts and differences in the number of junctions, etc. However, the resulting level difference can be eliminated by controlling the pre-amplifier 11 to adjust the Through signal and controlling the VOAs 35 in the MUX 19 to adjust the Add signal.

Figure 7:
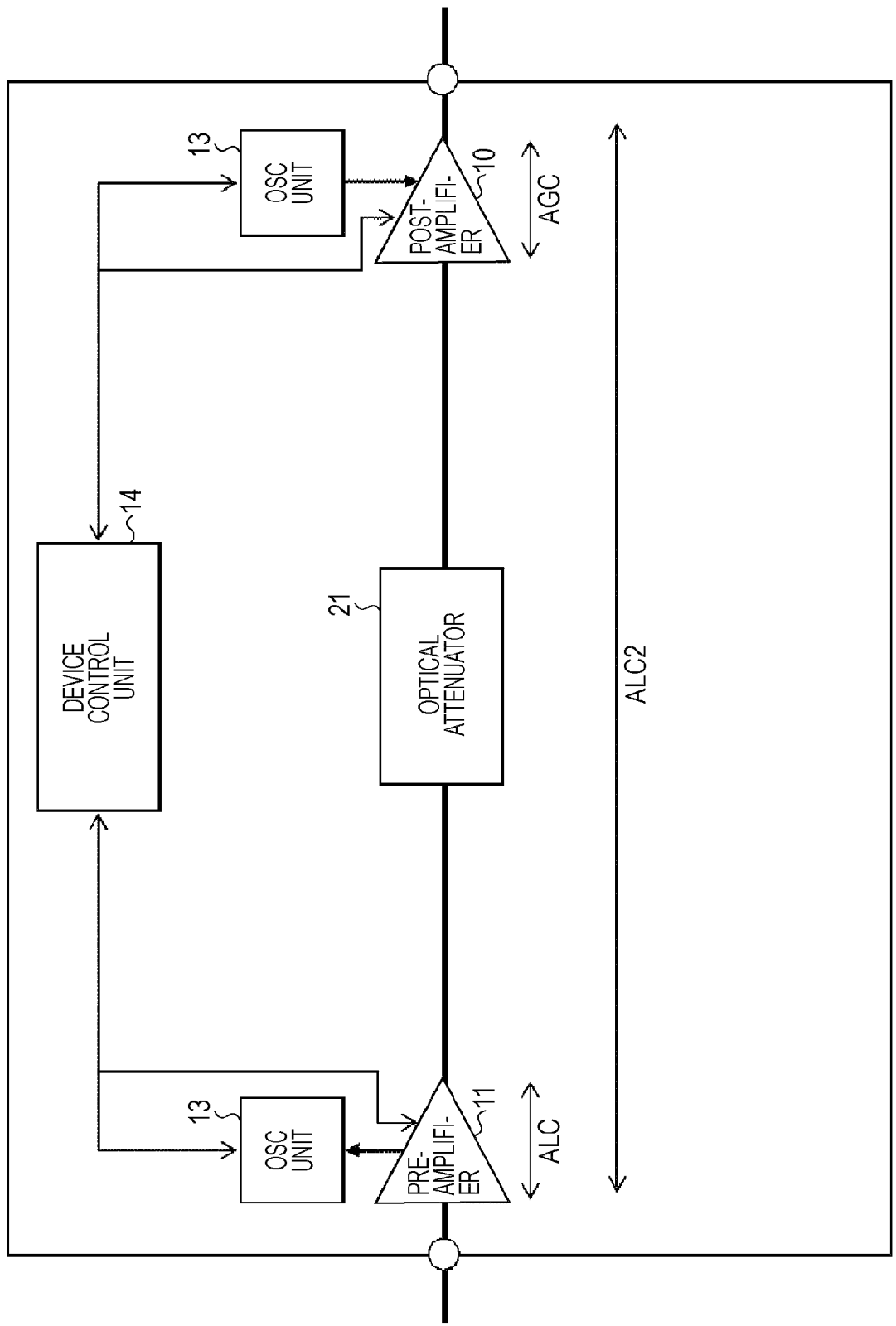
FIG. 7 is a block diagram of an ILA according to embodiment.

FIG. 7 is a block diagram of an ILA according to one embodiment of the present invention.

Figure 11:
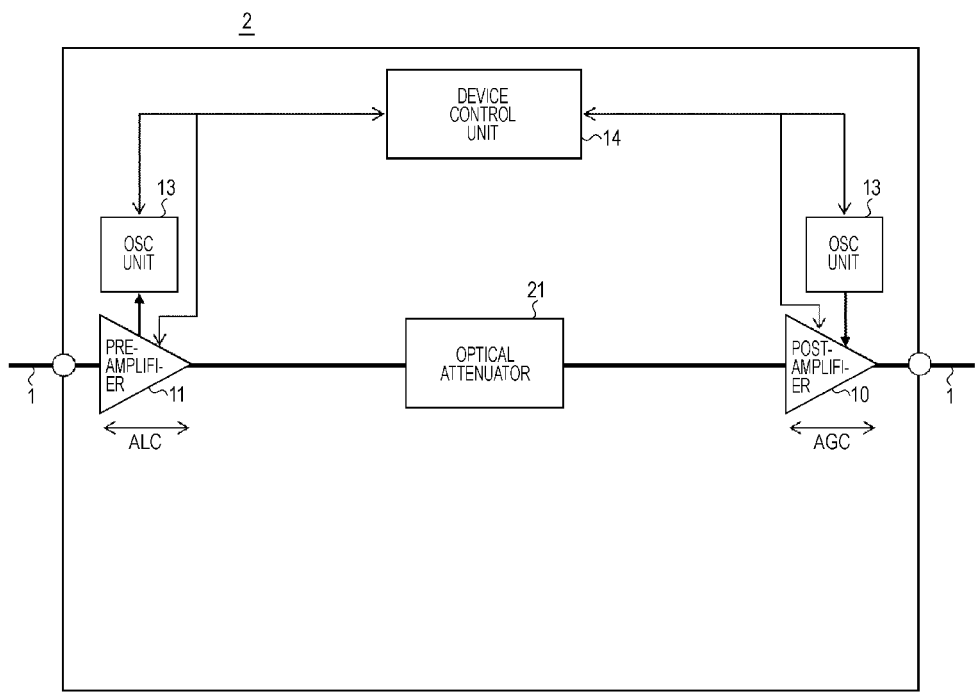
FIG. 11 is a block diagram of an ILA according to the related art.
Figure 12:
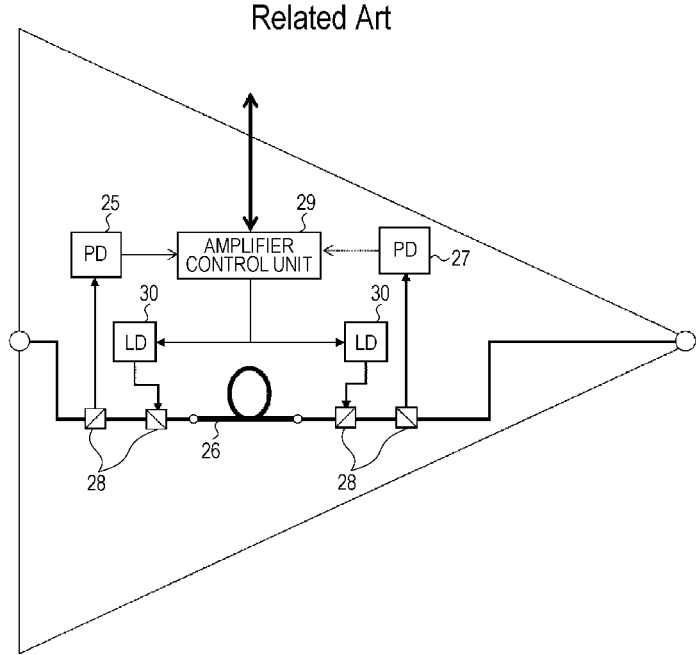
FIG. 12 is a block diagram of a post-amplifier according to the related art.
Figure 13:
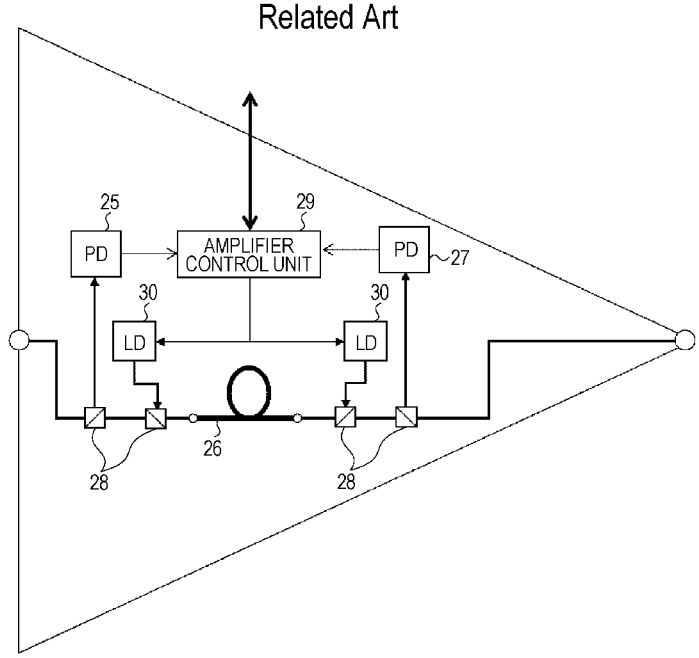
FIG. 13 is a block diagram of a pre-amplifier according to the related art.

The same components in FIG. 7 as those in FIG. 11 are denoted by the same reference numerals, and a description of those components is omitted here.

In the ILA shown in FIG. 7, a pre-amplifier 11 is ALC-controlled as a unit and a post-amplifier 10 is AGC-controlled as a unit. In addition to such control as a unit, an output light signal level of the post-amplifier 10 is detected and fed back to an output signal level of the pre-amplifier 11 so that the difference between the detected level and an appropriate value is compensated for. As a result, the ILA is ALC-controlled in its entirety (as indicated by ALC2).

In FIG. 7, the output light signal level of the post-amplifier 10 is deviated from the appropriate value due to deterioration of an optical attenuator 21 with the lapse of time and variations in characteristics caused by temperature changes.

Figure 8:
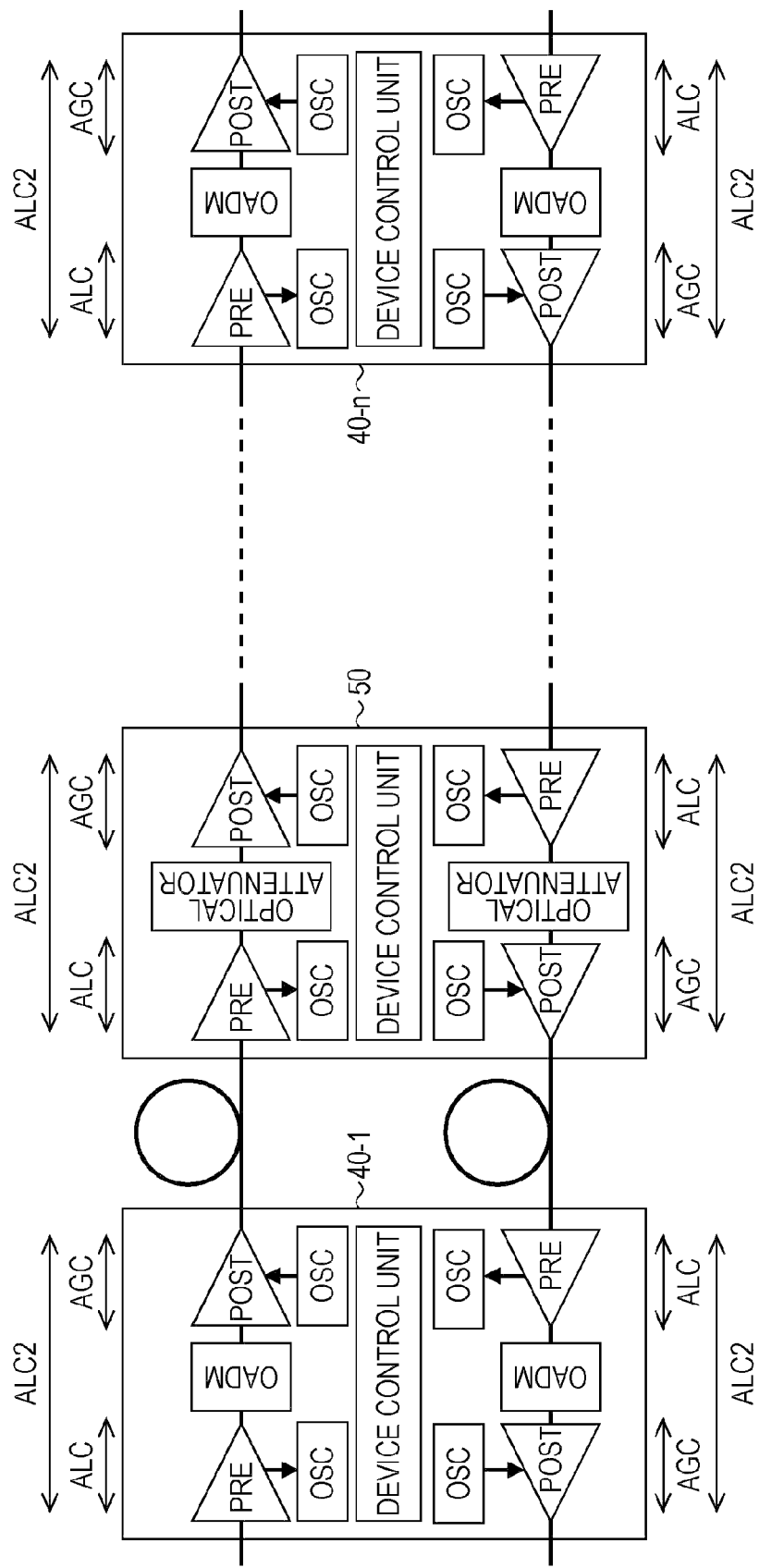
FIG. 8 illustrates an optical communication system using the ILAs each according to the embodiment.

FIG. 8 is a block diagram of an optical communication system using the ILA shown in FIG. 7.

In the optical communication system of FIG. 8, an ILA 50 is disposed between OADMs 40-1 and 40-2 and is connected to those OADMs via transmission lines. The ILA 50 includes an up-line device and a down-line device each including a pre-amplifier, a post-amplifier, an optical attenuator, and OSC units. The up-line device and the down-line device are both controlled by a device controller.

Figure 9:
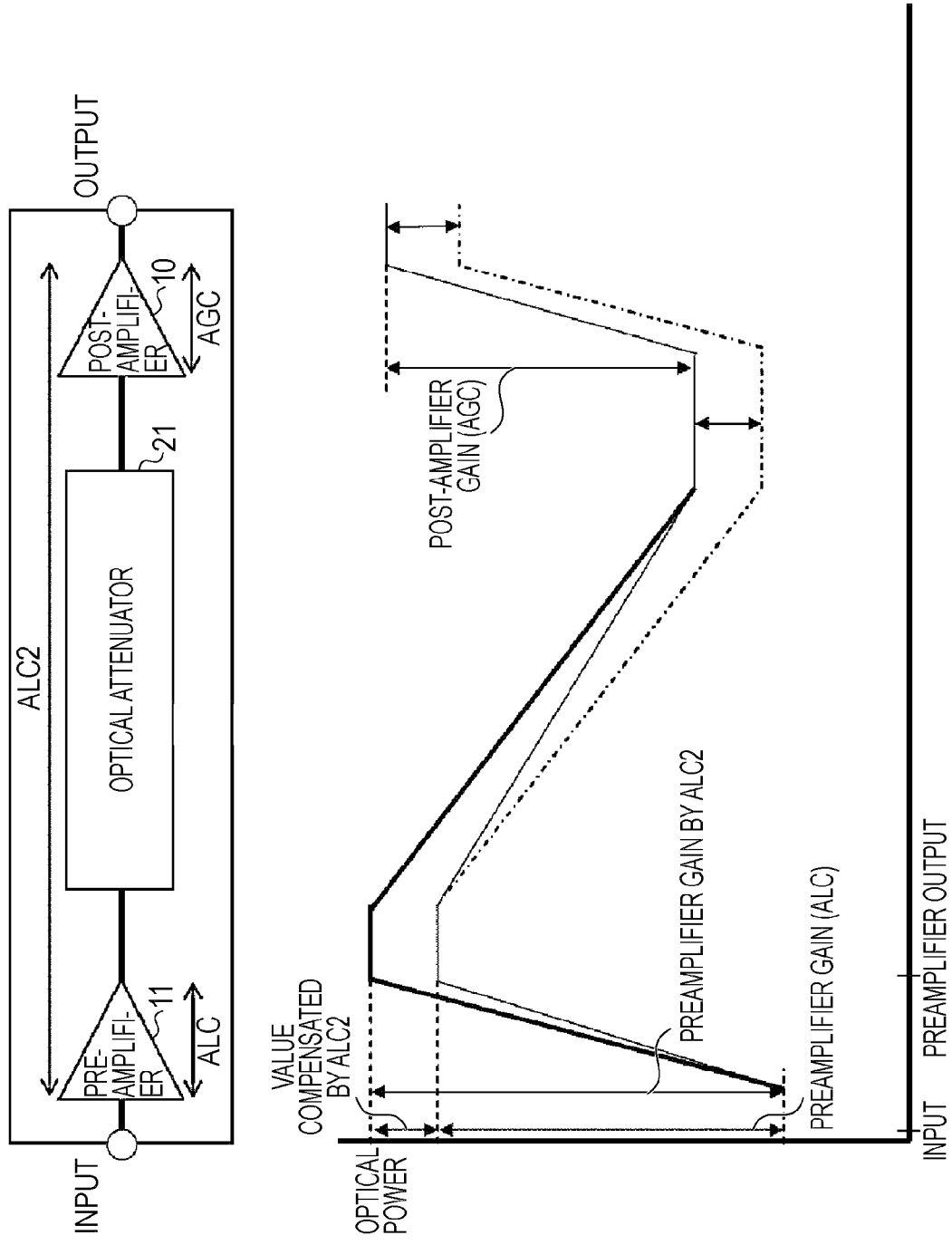
FIG. 9 illustrates level changes of an optical signal in the ILA according to the embodiment.

FIG. 9 is an explanatory view for explaining level changes of light signals in the ILA.

Referring to FIG. 9, a thin solid line represents a design value of the light level change. Due to temperature-dependent changes in loss at the optical attenuator, deterioration thereof with the lapse of time, variations in losses of individual optical attenuators, etc., the light level is changed as represented by a graph of a dotted line. Thus, an output level of the post-amplifier is changed from an optimum value.

A deviation of the output level of the post-amplifier from the optimum value is fed back to the pre-amplifier to adjust an output level of the pre-amplifier. In the case of FIG. 9, the output level of the post-amplifier can be set to the optimum value by increasing the output level of the pre-amplifier.

With the above-described control indicated by ALC2, the light level input to the transmission line can be set to an appropriate value and stable transmission characteristics can be obtained at all times.

Startup procedures for an ILA node system will be described below.

(1) A reference light (corresponding to one wave of the post-amplifier output) is output from the post-amplifier in the upstream node to adjust an amplifier gain.

(2) A gain of the most upstream ILA node is adjusted.

(3) AGC in the most upstream ILA node is started.

(5) If the downstream node is an ILA, the procedure shifts to (2). If the downstream node is an OADM, the relevant node is started up in accordance with the processing procedures, shown in FIGS. 5A and 5B, for the OADM.

According to the forgoing embodiments, as described above, in the device where the pre-amplifier is ALC-controlled as a unit and the post-amplifier is AGC-controlled as a unit, the output light signal level of the post-amplifier is detected and fed back to the output signal level of the pre-amplifier so that the difference between the detected level and the appropriate value is compensated for. Thus, the OADM or the ILA is ALC-controlled in its entirety. As a result, the light level input to the transmission line can be set to the appropriate value and stable transmission characteristics can be obtained at all times.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical apparatus, comprising:
a first optical amplifier subjected to automatic level control for adjusting an output value of an optical signal to a constant level;
an optical signal processor receiving an optical signal from the first optical amplifier and configured to process the optical signal;
a second optical amplifier receiving an optical signal from the optical signal processor and subjected to automatic gain control for adjusting a gain constant; and
a controller configured to detect a level of the optical signal at an output of the second optical amplifier, wherein
the controller is configured to adjust a level of an output value of the first optical amplifier such that the level of the optical signal at the output of the second optical amplifier is held at an optimum value if the detected level of the optical signal differs from the optimum value, and thereby compensate for a loss caused in the optical signal processor and maintain the level of the optical signal at the output of the second optical amplifier at the optimum value,
wherein the optical signal is a WDM light signal,
the optical signal processor comprises a wavelength selection switch for causing an optical signal to pass through, to be dropped, or to be added per wavelength,
a difference between a level of the optical signal added by the wavelength selection switch and the level of the optical signal having passed through the wavelength selection switch is detected and fed back to the first optical amplifier, and
the controller adjusts the level of the optical signal having passed through the wavelength selection switch based on the difference such that a level of the optical signal added by the wavelength selection switch is set equal to the level of the optical signal having passed through the wavelength selection switch using the automatic level control.

2. The optical transmission device according to claim 1, wherein the optical signal processor comprises an optical attenuator.

3. The optical transmission device according to claim 1, further comprising:
an optical attenuator for adjusting the level of the optical signal per wavelength, which is inserted through the wavelength selection switch; and
a multiplexing unit configured to multiplex the optical signals of respective wavelengths of which levels have been adjusted by the optical attenuators.

4. The optical transmission device according to claim 1, wherein an amount by which the level of the output value of the first optical amplifier is adjusted is equal to an amount by which a level of an output value of the second optical amplifier is deviated from the optimum value.

5. The optical transmission device according to claim 1, wherein an adjustment cycle of the level of the output value of the first optical amplifier in the controller is longer than a control cycle of the automatic level control of the first optical amplifier.

6. A method of controlling an output level in an optical apparatus, comprising:
adjusting an output value of a first optical amplifier to a constant level;
locating a wavelength selection switch for causing a WDM light signal to pass through, to be dropped, or to be added per wavelength before the first optical amplifier;
processing the WDM light signal at the wavelength selection switch;
locating a second optical amplifier before the wavelength selection switch;
subjecting the second optical amplifier to automatic gain control;
adjusting a gain constant of the second optical amplifier;
providing a controller at an output of the second optical amplifier;
detecting a difference between a level of a wavelength of the WDM light signal added by the wavelength selection switch and a level of a wavelength of the WDM light signal having passed through the wavelength selection switch;
feeding the difference back to the first optical amplifier;
adjusting the level of the wavelength of the WDM light signal having passed through the wavelength selection switch based on the difference using automatic level control such that the level of the wavelength of the WDM light signal added by the wavelength selection switch is set equal to the level of the wavelength of the WDM light signal having passed through the wavelength selection switch;

compensating for a loss caused in the wavelength selection switch; and maintaining the level of the WDM light signal at the output of the second optical amplifier at an optimum value.

* * * * *